(12) United States Patent
Wong

(10) Patent No.: US 7,734,270 B2
(45) Date of Patent: Jun. 8, 2010

(54) METHOD AND APPARATUS FOR AN ENHANCED RFID TAG INTERROGATOR

(75) Inventor: Kai En Wong, Singapore (SG)

(73) Assignee: Kenetics Innovations Pte Ltd, Singapore (SG)

( * ) Notice: Subject to any disclaimer, the term of this patent is extended or adjusted under 35 U.S.C. 154(b) by 1328 days.

(21) Appl. No.: 10/546,425

(22) PCT Filed: May 21, 2004

(86) PCT No.: PCT/SG2004/000143

§ 371 (c)(1),
(2), (4) Date: Aug. 19, 2005

(87) PCT Pub. No.: WO2004/107595

PCT Pub. Date: Dec. 9, 2004

(65) Prior Publication Data

US 2006/0160515 A1 Jul. 20, 2006

(30) Foreign Application Priority Data

May 27, 2003 (SG) .............................. 200303230-7

(51) Int. Cl.
*H04B 1/10* (2006.01)
(52) U.S. Cl. .................... 455/296; 455/41.1; 455/90.2; 455/550.1; 342/42; 342/51

(58) Field of Classification Search ................. 455/41.1, 455/3.05, 41.2, 73, 550.1, 90.2, 130, 168.1; 342/51, 42, 57
See application file for complete search history.

(56) References Cited

U.S. PATENT DOCUMENTS

| | | | | |
|---|---|---|---|---|
| 6,211,799 | B1 * | 4/2001 | Post et al. | 341/33 |
| 6,282,407 | B1 * | 8/2001 | Vega et al. | 455/41.1 |
| 6,353,406 | B1 * | 3/2002 | Lanzl et al. | 342/118 |
| 6,946,989 | B2 * | 9/2005 | Vavik | 342/51 |

* cited by examiner

*Primary Examiner*—Tony T Nguyen
(74) *Attorney, Agent, or Firm*—Pyprus Pte Ltd

(57) ABSTRACT

An apparatus for an enhanced receiver for an RFID Tag Interrogator is described. The enhanced receiver has a zero crossing detector, a phase shifter, a pulse generator and a chopper. The zero crossing detector produces a sampling signal from the current transformer. The phase shifter modifies the sampling signal by producing a 90 degree phase shifted sampling signal. The pulse generator increases time duration of each pulse of the phase shifted sampling signal, which is then fed to the chopper. Thus, the chopper samples the backscattered carrier signal every 90 degree phase shift from the time when the backscattered carrier signal passes the zero crossing. This makes isolation of the backscattered signal from the carrier signal more effective.

4 Claims, 2 Drawing Sheets

METHOD AND APPARATUS FOR AN ENHANCED RFID TAG INTERROGATOR

FIELD OF THE INVENTION

The present invention generally relates to Interrogators for RFID Tags utilizing backscatter modulation. In particular, the invention relates to a method and apparatus for an enhanced Interrogator for RFID Tags utilizing backscatter modulation.

BACKGROUND OF THE INVENTION

RFID systems today are well known and used for tracking, identifying and monitoring a variety of items from shipping containers to library books. A typical RFID system would comprise several RFID Tags and at least one Interrogator. The Interrogator communicates with the RFID Tags by transmitting carrier signals modulated with data to the RFID Tags. The RFID Tags in turn modulates the modulated carrier signals from the Interrogator using modulated backscattering and reflects and replies to the Interrogator.

Commands and data modulated in the carrier signals are sent to the RFID Tag through the antenna via RF coupling. While the RFID Tag's reception of the Interrogator's commands and data may possesses good signal to noise ratio, the Interrogator's reception of the RFID Tag's reply may not be so.

Amplitude of backscattered signals are generally low and depends on the distance from the Interrogator's antenna to the RFID Tag. The amplitude difference may be as disparate as 120 dB below the carrier signal's amplitude. This results in the amplitude of the RFID Tag's reply being in the range of 100 uV on a carrier signal of 60 volts peak to peak. Furthermore, the modulation frequency of backscattered signals are low compared with the frequency of the carrier signal. The modulation frequency of a backscattered signal is typically a few hundred kilohertz for a carrier signal having a frequency of about 13.56 megahertz. These disproportionate differences in amplitudes and frequencies between carrier and backscattered signals have caused problems with data retrieval.

Presently, research and developmental efforts spent on isolating the backscattered signals from carrier signals have yielded results which are far from satisfactory. The attenuation of the large carrier signals inherently reduces the backscattered signals, giving rise to poor noise performance. In attempting to raise the level of the backscattered signals, some manufacturers have resorted to simply increasing the transmission power. This method not only fails to improve the signal to noise ratio of the Interrogator's reception of the RFID Tag's reply but may even run foul of transmission power limitations.

Another concern is the existence of "blackholes" in the activation field of an Interrogator. These "blackholes" are regions in the activation field where the replies of the RFID Tags cannot be correctly received by the Interrogator. As the backscattered signals take the form of Double Side Band Without suppression of the carrier signal, the side bands can interfere with the carrier signal by way of multi-path reflection and phase delays to cause erroneous effects on the received backscattered signal. This may result in data inversion and data fallout. These effects are especially common in Interrogators employing amplitude demodulation techniques such as diode detectors. It is also occurs in single antenna systems as both transmitted and received signals originate from one point. This creates a higher chance for signals to interfere and with only one reference point, higher difficulty in isolating the backscattered signal.

Another influence in the quality of backscattered data retrieval is the noise in the transmitting circuit. Inherent noise in the transmission will often mask the backscattering signals.

The present invention prevents the erroneous recovery of backscattered signals from RFID Tags and provides extremely high signal to noise ratio for the reception of backscattered signals. The present invention is also designed for low inherent noise.

Conventional Interrogators typically are able to communicate with RFID Tags on a single backscattered frequency. Similarly, typical RFID Tags only communicate with Interrogators via single frequency backscattered modulation. Furthermore, there have not been requirements for Interrogators capable of simultaneous communication with a plurality of RFID Tags operating on a plurality of different frequencies. There also have not been requirements for Interrogators capable of communicating with individual RFID Tags operating on more than one backscattered frequency.

The present invention further addresses the future need for Interrogators capable of simultaneously communicating with a plurality of RFID Tags working on a plurality of different frequencies as well as RFID Tags individually operating on more than one backscattered frequency.

SUMMARY OF THE INVENTION

The present invention seeks to provide a method and apparatus for an enhanced RFID Tag Interrogator, Accordingly, in one aspect, the present invention provides, an apparatus for an enhanced receiver for an RFID Tag Interrogator having a current transformer and an antenna, the enhanced receiver comprising: a zero cross detector for receiving an input current waveform from the current transformer and for producing a sampling signal based on the input current waveform; a phase shifter for phase shifting the sampling signal by about ninety degrees to produce a phase shifted sampling signal; a pulse generator for increasing time duration of each pulse of the phase shifted sampling signal to produce a control signal for controlling a chopper; the chopper for receiving and sampling a backscattered carrier signal from the antenna; and a bandpass filter for filtering away a carrier signal of the backscattered carrier signal.

In another aspect, the present invention provides, a method for receiving a modulated backscattered carrier signal, steps comprising: producing a sampling signal comprising of a plurality of instantaneous pulses in accordance with zero crossing of a current waveform of the modulated backscattered carrier signal; phase shifting the sampling signal by about ninety degrees; increasing time duration of the instantaneous pulses by a predetermined duration to produce a control signal; and controlling a chopper with the control signal to sample the modulated backscattered carrier signal.

In a further aspect, the present invention provides, an apparatus for an RFID Tag Interrogator having a current transformer and an antenna, the apparatus comprising: an enhanced receiver; and a Variable Bandpass Multi-Band Demodulator.

BRIEF DESCRIPTION OF THE DRAWINGS

A preferred embodiment of the present invention will now be more fully described, with reference to the drawings of which.

DESCRIPTION OF THE INVENTION

A method and apparatus for an enhanced RFID Tag Interrogator in a preferred embodiment is described. It shall be apparent to one skilled in the art, however that the invention may be practiced without such details. Some of the details may not be described at length so as not to obscure the invention.

Figure 1:
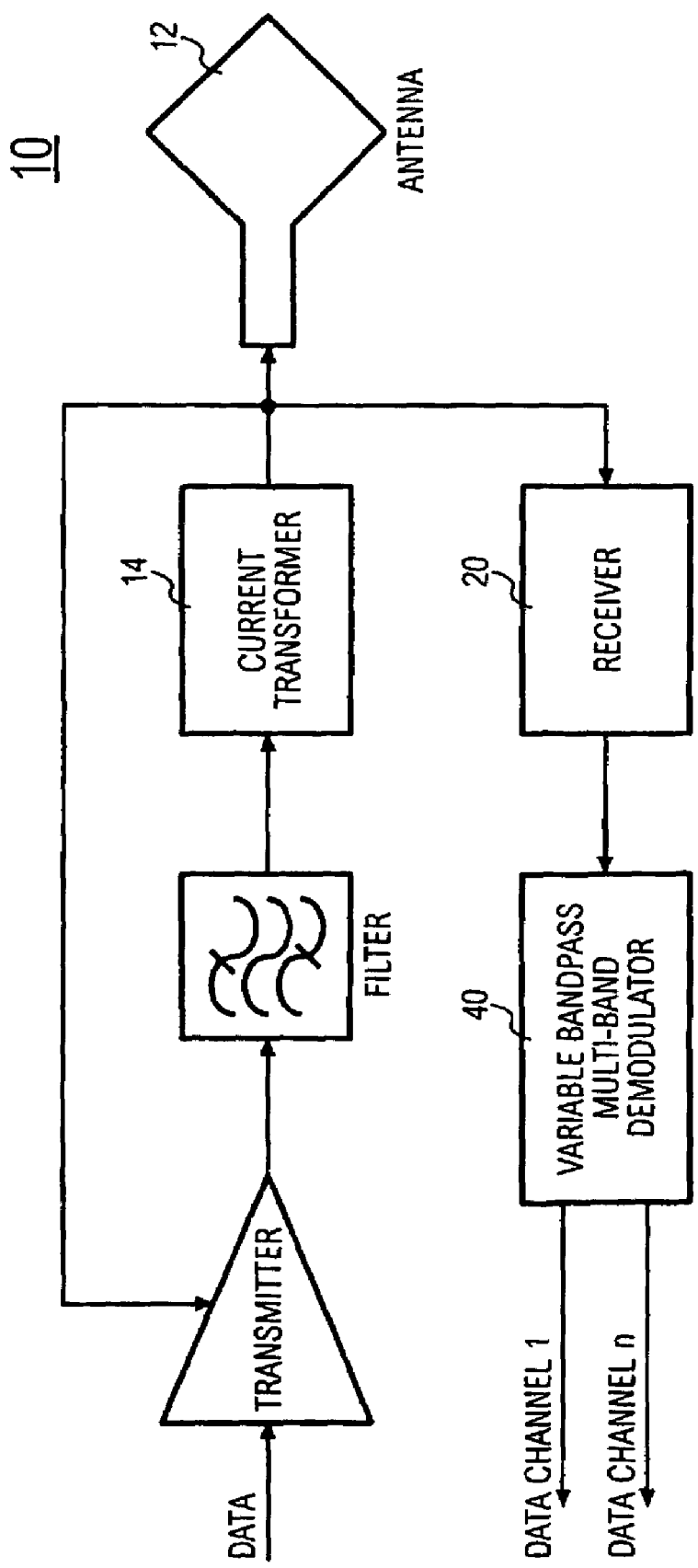
FIG. 1 illustrates a block diagram of an RFID Tag Interrogator incorporating the apparatus in accordance with the present invention.
Figure 2:
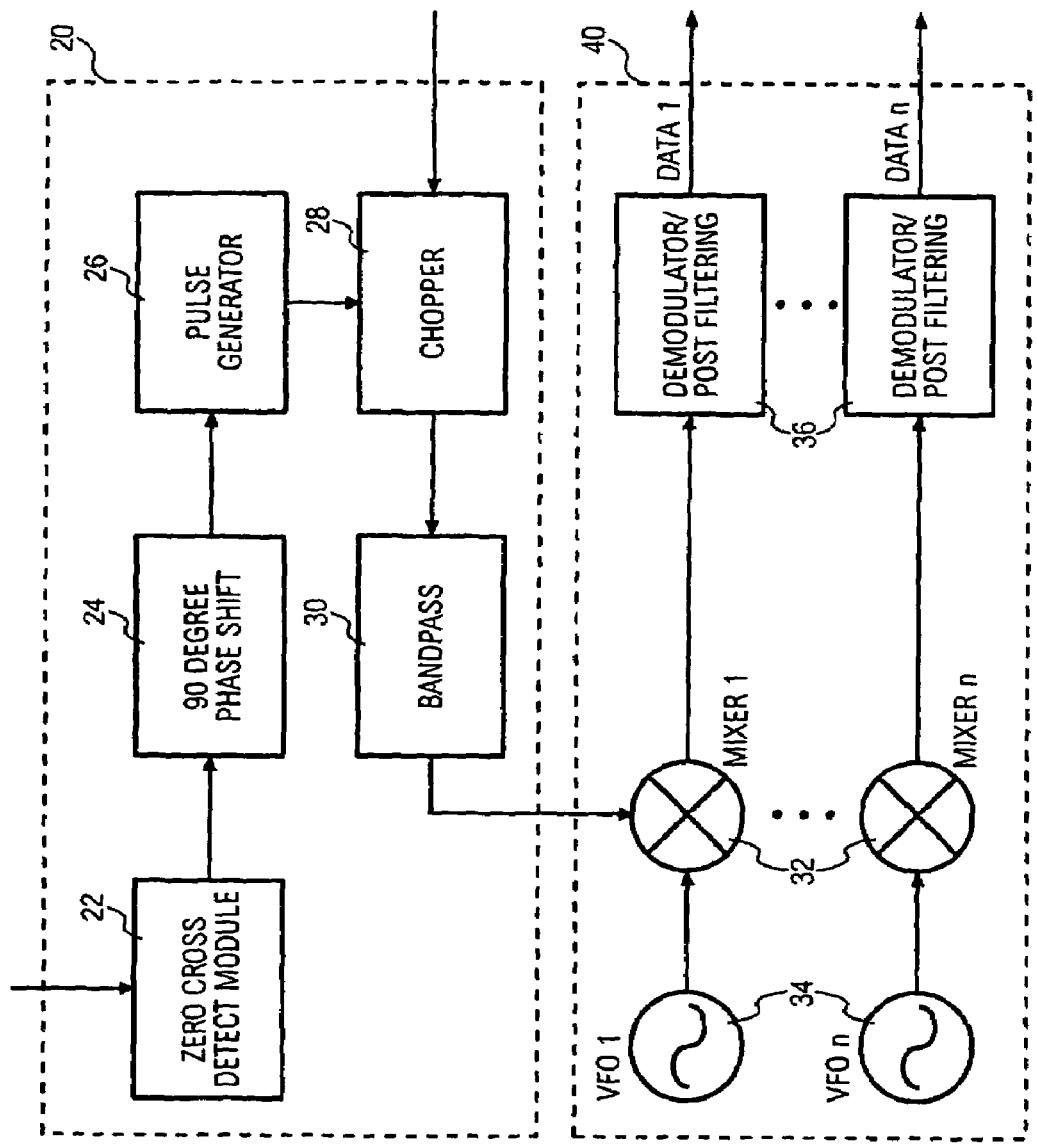
FIG. 2 illustrates the apparatus in accordance with the present invention.

Referring to FIG. 1 and FIG. 2, the apparatus in accordance with the present invention is illustrated. An Interrogator 10 having an enhanced receiver 20 and a Variable Bandpass Multi-Band (VBMB) Demodulator 40 in accordance with the present invention is illustrated. The enhanced receiver 20 is coupled both to the current transformer 14 and the antenna 12 of the Interrogator 10. The enhanced receiver 20 is further coupled to the VBMB Demodulator 40.

The Interrogator 10 further comprises known portions such as transmitters and filters coupled to the antenna 12, the current transformer 14, and the enhanced receiver 20.

The enhanced receiver 20 comprises a zero cross detector 22, a phase shifter module 24, a pulse generator 26, a chopper 28 and a bandpass filter 30. The zero cross detector 22 is coupled both to the current transformer 14 of the Interrogator 10 and to the phase shifter 24. The zero cross detector 22 receives an input of a current waveform of the backscattered carrier signal received by the antenna from the current transformer 14. The zero cross detector 22 determines the time instants at which the current waveform crosses over from positive to negative or negative to positive and outputs sampling signal comprising of a series of instantaneous pulses. Each instantaneous pulse of the sampling signal indicates a time instant at which the current waveform of the received signal has crossed over or under the zero value.

The zero cross detector 22 is further coupled to the phase shifter 24 which allows the sampling signal to be phase shifted by about 90°. The phase shifted sampling signal is then sent to a pulse generator which increases the sampling time of each of the series of instantaneous pulses of the phase shifted sampling signal to produce a control signal. The width of these pulses are determined by the sensitivity desired when sampling the backscattered carrier signal. The control signal which is the output from the pulse generator 26 is then used to control the chopper 28 for sampling the backscattered carrier signal from the antenna 12.

It can thus be seen that the sampling of the backscattered carrier signal by the chopper 28 occurs at about every 90° phase shift from the time when the backscattered carrier signal crosses over or under the zero value. This occurrence is due to the control signal from the pulse generator 26 being based similarly on the current waveform of the backscattered carrier signal crossing over or under the zero value and being phase shifted by about 90° by the phase shifter 24.

The overall effect results in the sampling of the backscattered carrier signal at the location and time when the backscattered carrier signal is at its highest or lowest amplitude and detection of any amplitude changes is easily isolated.

The output from the chopper 28 which is the chopped backscattered carrier signal is then sent to the bandpass filter 30 for filtering away of the carrier signal. The bandpass filter 30 may be based on ceramic, surface wave or other common filter architectures. The bandpass filter 30 also serves to perform image rejection. The output from the bandpass filter 30 thus contains only the backscattered signal and a D.C voltage without the carrier signal. As this method is sensitive to both phase modulation and amplitude, modulation, it forms the primary detector.

The backscattered signal from the bandpass filter 30 is then amplified and mixed with multiple frequencies and separately demodulated in the Variable Bandpass Multi-Band (VBMB) demodulator 40. The VBMB Demodulator 40 comprises of a plurality of mixers 32 coupled to a plurality of Variable Frequency Oscillators (VFOs) 34. The plurality of mixers 32 are farther coupled to a plurality of backscattered signal demodulators 36.

This VBMB demodulator 40 can be heterodyne, superheterodyne or direct conversion demodulators. These VBMB demodulators may employ quadrature detectors and receive signal strength indicators to recover both Frequency Shift Keying and Amplitude Shift Keying based data. Phase detectors and Phase Lock Loops can also be added to provide Phase Shift Keying demodulation.

Image rejection and single side band operation enhances the rejection of unwanted signals and noise while improving backscattered signal to noise ratio. Together with a transmitter with low noise floor, can eliminate "blackholes" in the interrogating field. The low noise transmitter and high backscatter sensitivity lowers the transmission power requirement and eases regulatory compliance.

The VBMB Deodulator 40 has the ability to simultaneously demodulate multiple backscattered frequencies enabling "multi-band" operation. This is crucial for implementing systems with security features such as Electronic Article Surveillance (EAS).

An example of which is a RFID Tag replying via backscattered modulation to the Interrogator 10 at a frequency of 423 KHz after receiving a command signal from the Interrogator 10. This is a command and reply type system whereby Interrogator 10 has communication priority. The same system may also consist of the RFID Tags operating a second backscattered frequency of 2.4 MHz once they are in the activation field of the Interrogator 10. The operation of this second backscattered frequency occurs independently of the Interrogator's command signal and is based on RFID Tags having the communication priority. This independent operation of the RFID Tag is often for the implementing of the abovementioned EAS. The 2.4 MHz system co-exists with the 423 KHz system. With conventional single band systems, either the backscattered data or the EAS signal is received, therefore losing the other signal. The present invention however advantageously allows both signals to be received simultaneously.

It will be appreciated that various modifications and improvements can be made by a person skilled in the art without departing from the scope of the present invention.

The invention claimed is:

1. An enhanced receiver for an RFID Tag Interrogator having a current transformer and an antenna, said enhanced receiver comprising:

a zero cross detector for receiving an input current waveform from said current transformer and for producing a sampling signal based on said input current waveform;

a phase shifter for phase shifting said sampling signal by about ninety degrees to produce a phase shifted sampling signal;

a pulse generator for increasing time duration of each pulse of said phase shifted sampling signal to produce a control signal for controlling a chopper; said chopper for receiving and sampling a backscattered carrier signal from said antenna; and a bandpass filter for filtering away a carrier signal of said backscattered carrier signal.

2. A method for receiving a modulated backscattered carrier signal, steps comprising:
   a. producing a sampling signal comprising of a plurality of instantaneous pulses in accordance with zero crossing of a current waveform of said modulated backscattered carrier signal;
   b. phase shifting said sampling signal by about ninety degrees;
   c. increasing time duration of said instantaneous pulses by a predetermined duration to produce a control signal; and
   d. controlling a chopper with said control signal to sample said modulated backscattered carrier signal.

3. An apparatus for an RFID Tag Interrogator having a current transformer and an antenna, said apparatus comprising:
   an enhanced receiver; and
   a Variable Bandpass Multi-Band Demodulators;
   wherein said enhanced receiver comprises;
   a zero cross detector for receiving an input current waveform from said current transformer and for producing a sampling signal based on said input current waveform;
   a phase shifter for phase shifting said sampling signal by about ninety degrees to produce a phase shifted sampling signal;
   a pulse generator for increasing time duration of each pulse of said phase shifted sampling signal to produce a control signal for controlling a chopper; said chopper for receiving and sampling a backscattered carrier signal from said antenna; and
   a bandpass filter for filtering away a carrier signal of said backscattered carrier signal.

4. The apparatus in accordance with claim 3, wherein said Variable Bandpass Multi-Band Demodulator comprises:
   a plurality of variable frequency oscillators;
   a plurality of mixers; and
   a plurality of demodulators;
   wherein said plurality of mixers for receiving a plurality of backscattered signals from said enhanced receiver and for mixing said plurality of backscattered signals with variable frequencies from said plurality of variable frequency oscillators;
   further wherein said plurality of demodulators for receiving input from said plurality of mixers and for separately demodulating each of said plurality of backscattered signals.

* * * * *

UNITED STATES PATENT AND TRADEMARK OFFICE
CERTIFICATE OF CORRECTION

PATENT NO. : 7,734,270 B2 Page 1 of 1
APPLICATION NO. : 10/546425
DATED : June 8, 2010
INVENTOR(S) : Kai En Wong It is certified that error appears in the above-identified patent and that said Letters Patent is hereby corrected as shown below:

Column 5, line 18 claim 3, delete "Demodulators" and replace with "Demodulator"

Signed and Sealed this

Third Day of August, 2010

David J. Kappos
*Director of the United States Patent and Trademark Office*